Dec. 9, 1930.  G. D. HARRIS  1,784,727
METHOD OF AND APPARATUS FOR CONDITIONING LUMBER AND OTHER MATERIALS
Filed April 14, 1926  2 Sheets-Sheet 1
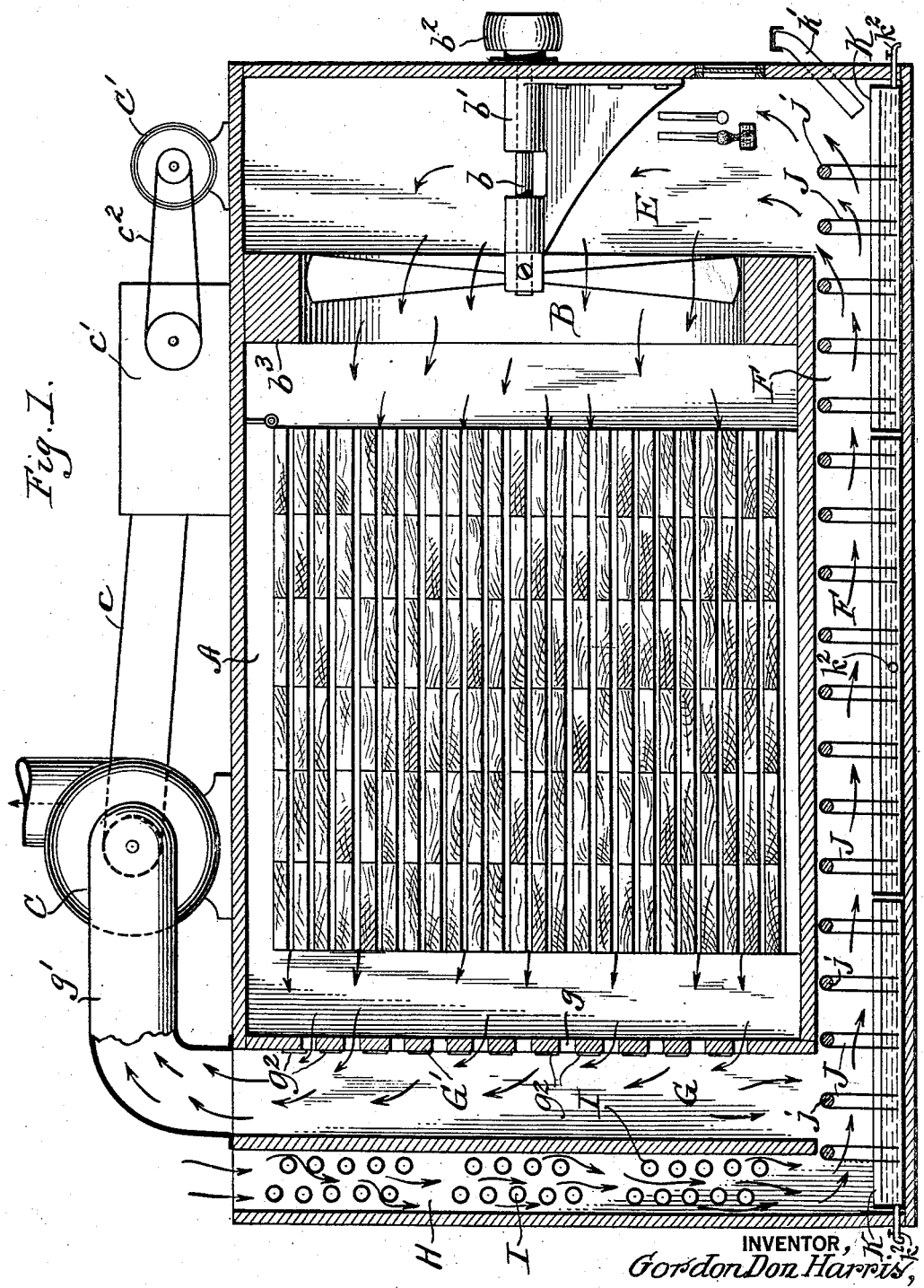
INVENTOR,
Gordon Don Harris,
BY
ATTORNEY

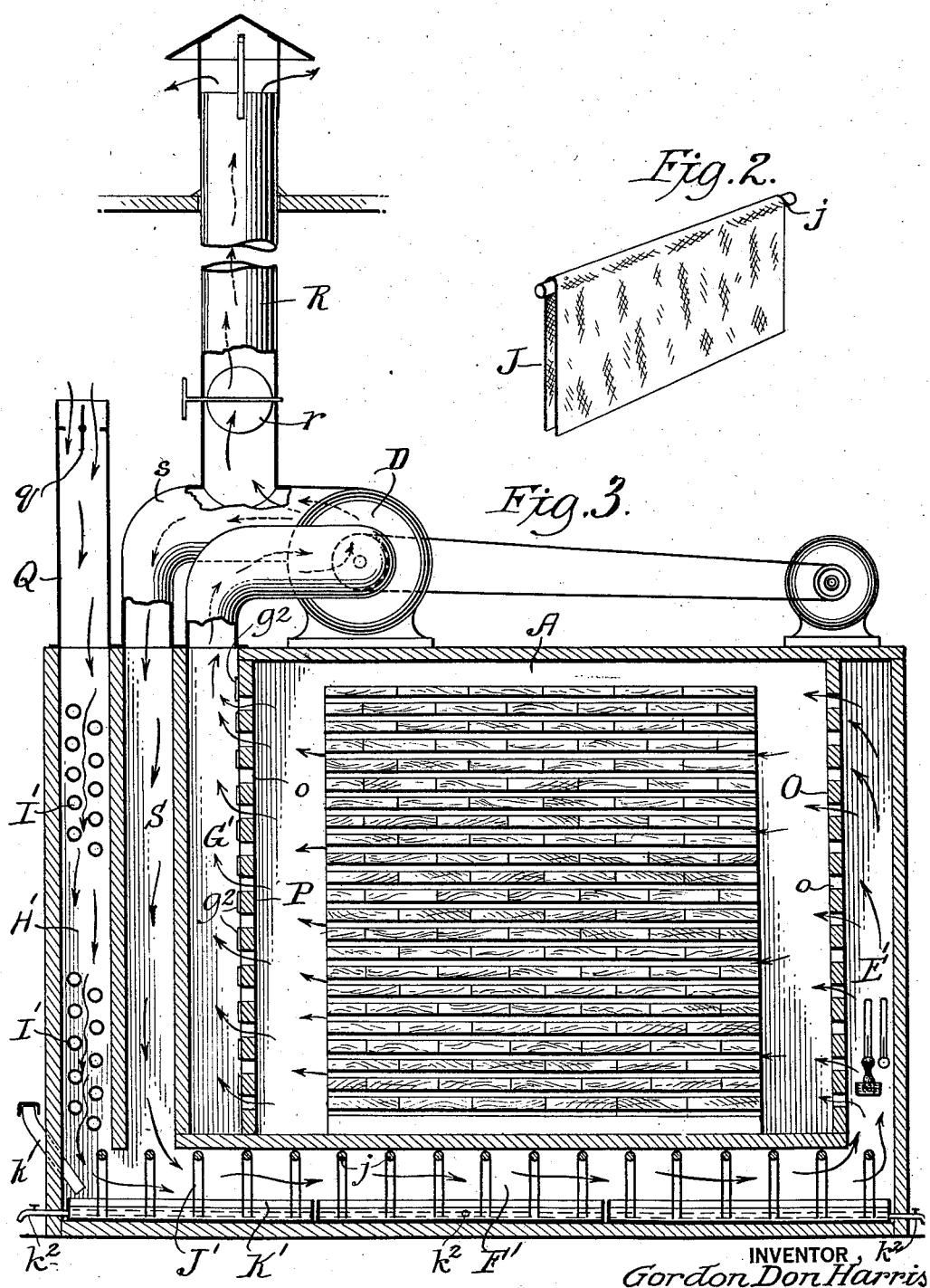

Patented Dec. 9, 1930

1,784,727

UNITED STATES PATENT OFFICE

GORDON D. HARRIS, OF STAMFORD, CONNECTICUT, ASSIGNOR TO THE INDUSTRIAL DRYER CORPORATION, OF STAMFORD, CONNECTICUT, A CORPORATION OF CONNECTICUT

METHOD OF AND APPARATUS FOR CONDITIONING LUMBER AND OTHER MATERIALS

Application filed April 14, 1926. Serial No. 101,869.

My invention is a method of drying or seasoning wood for industrial and construction purposes, and it pertains, also, to an apparatus the construction of which is well adapted for efficiently carrying out such process, whereby a certain or determined portion of the water naturally contained in the wood is removed economically.

It is well known that water present in wood is retained in two ways; it is held in the pores or cells, and it is held also in the wood fibres or cell walls. In seasoning or drying wood, the removal of the cell water takes place first, and this is accomplished without much effort as compared with the effort required for the elimination of the water present in the wood fibres or cell walls. Subsequent to the removal of the free water, or water from the pores or cells, the treatment is continued in order to thereafter remove the water present in the fibres, and this second stage is obtained in ratio to the equalization or diffusion of the contained water which brings it to the surfaces of the cells. Any interruption or break in the continuity of flow of the fibre water to the surface, or a removal of the fibre water from the cell walls faster than the water can equalize by diffusion, will result in stresses and strains of the cell walls, creating loss of wood and degrading it because of inferior quality.

In my invention these causes of degrading are eliminated by creating in the process and in the apparatus a varying condition of the drying atmosphere corresponding, at least approximately, to the varying conditions of moisture content in and upon the surfaces of the material under treatment, whereby I am enabled to first set up the flow to the wood surface of the free or cell water present in the wood and to subsequently remove the fibre water from the surfaces of the cells in direct proportion to the equalization by diffusion of the contained fibre water.

In my mode of treatment, the drying atmosphere is conditioned by imparting a true humidity thereto, and such atmosphere after flowing into contact with the material is revitalized by diluting and mixing it with fresh atmospheric air carrying the required heat units, whereby the drying atmosphere is available for recirculation into repeated contacts with the material.

In carrying out my process, atmospheric air is preheated and is initially conditioned by flowing it into contact with saturated elements for the absorption of moisture substantially in the absence of heat tending to change the atmosphere into a gas, thus giving to the air a true humidity. The atmosphere at a desired temperature and with a determined moisture content flows into contact with the material, exchanging heat for moisture, thus increasing its moisture content, whereupon a definite proportion of the atmosphere is discharged and the remainder is directed in a path for admixture with fresh preheated air, such mixture of moist air and of the preheated air being conducted again into a chamber within which the mixture is further treated, whereby the atmosphere is conditioned to a given moisture content and to a desired temperature in definite proportion one to the other, and such conditioned atmosphere is utilized for seasoning, conditioning and drying the material under treatment.

Other functions and advantages of the invention will appear from the following description taken in connection with the drawings, wherein—

Figure 1 is a vertical sectional elevation of one form of lumber drier embodying my invention.

Figure 2 is a perspective view of one of the elements used for humidifying the atmosphere.

Figure 3 is a vertical sectional elevation of another embodiment of apparatus which may be considered a form of apparatus best adapted for drying lumber.

As shown in Figure 1, A is a working chamber, of appropriate dimensions for a charge of the substance to be treated, such as lumber, which should be stacked for the free flow through it of a conditioned drying atmosphere adapted to be circulated in the required volume and at a determined velocity by a blower B and an exhauster C, as in Figure 1, although in some installations I may use an exhauster D to the exclusion of the blower, as in Figure 3, for circulating the air. The blower in Figure 1 is a fan on a shaft $b$ journaled at $b'$ and driven by a belt pulley $b^2$, said fan being operable within a casing $b^3$, which has communication freely with a flue E leading upwardly from a humidifying chamber F.

At the delivery end of the working chamber is a vertical division wall G,' provided with openings $g$ with or without area determining slides as $g^2$, such openings $g$ constituting a series of ports the area of which is such as to establish an appreciable pressure or "head" of the atmosphere within the working chamber, contributing measurably to equalize the flow of such atmosphere across or within the drying compartment A.

Said division G' constitutes one wall of a flue G constituting an air exhaust and an air recirculating chamber. From the upper part of this flue G leads a duct $g'$ by which some of the air is conducted to the intake of the exhauster C, mounted upon the housing A. As shown in Figure 1, this exhauster is a fan driven by a belt $c$ from a variable-speed mechanism of any approved construction, the casing of which is indicated at $c'$, and such speed mechanism is motor driven by a belt $c^2$ from a motor C'. The lower part of this flue G is connected to the humidifying chamber or duct F.

Air is supplied through a vertical chamber or flue H, extending alongside the flue G, said flues G, H, being shown as parallel. The chamber H is open to the external atmosphere, and said chamber H and the flue G have free communication with the humidifying chamber F. Fresh atmospheric air is supplied through chamber H under the impulse or suction of blower B, and such inflowing air is heated to a desired temperature by heaters I positioned within such chamber H. The heaters are shown as steam coils, or a battery of radiators, extending for length of the chamber, and said radiators are of a desired capacity for imparting to the inflowing air the heat units required for evaporating the contained moisture within the substance present in the working chamber and may be regulated to meet varying conditions.

The air flowing within and through chamber F is conditioned by charging it with moisture until it attains a desired degree of saturation, and in my invention humidification of the air is effected under conditions which impart a true humidity thereto, i. e., the air is not reheated after the absorption of moisture and it is then utilized for the treatment of the wood. I have found that air supplied in large volume and moving at a suitable velocity may be humidified to a required saturation by directing the flow of such air into contact with a multiplicity of saturated elements adapted to give off their contained moisture freely. To these ends, saturated elements J are positioned within the chamber F, across the line of flow of the air, such elements being partly immersed in, or dipping into, the liquid of a tank, K, or a plurality of such tanks, K, for keeping said elements saturated with liquid. In the form shown, each element J is composed of a length of absorbent material which is looped over a rod or bar $j$, for the free ends of such absorbent material to dip into the liquid present within the tank, or tanks, K.

The absorbent elements are arranged in a desired order within the chamber F, and the air flowing within this chamber has relatively intimate contact with the saturated elements. The absorbent elements dip into the liquid of tank or tanks K, and by capillary action, the liquid is diffused throughout the area of the suspended fabrics, the effect of which is to keep the elements saturated with the liquid.

As shown, a series of rods, $j$, are fixedly secured within chamber F, at appropriate intervals therein, and near the top of the chamber. The absorbent elements are spaced relatively to each other, and they are contained within the chamber F, crosswise of the line of flow of the air.

The air flowing within the chamber F impinges the saturated elements, and thus the air takes up moisture until it attains the desired saturation.

In the service of the apparatus, shown in Figure 1, the material is loaded within the chamber, liquid is supplied to the tank or tanks, K, as by pouring it into the filler pipe, $k'$, steam is supplied to the radiators, and fans B, C, set into motion. Air is drawn by fan B through chambers H, G, F, and blown into chamber A; in the passage of the air through said chambers H, G, F, new air is heated in H by the described heating means, recirculated air from G mixes and is supplied with heat from new air from H, total volume then travels through F where, by an exchange of heat for water vapor, the predetermined humidity and temperature is made, before operating air is directed into contact with product or material to be dried, seasoned or conditioned.

The treating and conditioning of the operating air, to meet the varying conditions of the product or material being dried, conditioned or seasoned, is always under complete control. For instance the heating of the air may be controlled by regulating the heating effect of the radiator, and the humidifying may be controlled by regulating the effectiveness of the humidifying apparatus.

The drying atmosphere flows out of the working chamber A into the combined flue and recirculating chamber G, some of the moisture laden air being lifted by the exhauster C through the flue g' and thence discharged from the apparatus, whereas another definite proportion of the warm moist air flows downwardly through chamber or duct G, back into the humidifying chamber F. The returning moist air, and the preheated air admitted by chamber H, meet at or about the intake to the humidifying chamber, whereby the flow of the returning moist air is mixed with fresh atmospheric air preheated to a desired temperature, the effect of which is to revitalize the drying atmosphere to be recirculated, and such revitalized atmosphere is further conditioned by humidifying the same by circulating it within the chamber F, and into contact with the moisture giving suspended elements J, whereby the humidity and temperature of the drying atmosphere are maintained in a definite proportion to each other, and such humid atmosphere, at a desired temperature, is conducted within the working chamber A.

In the apparatus of Figure 3, the blower, such as B, is omitted, and the atmosphere is circulated by an exhauster D. At the respective ends of the work chamber A are division walls O, P, provided with openings o positioned in vertical series, with or without slides, for equalizing the distribution of the atmosphere within the chamber, and for the establishment of a desired pressure or "head" therein. Adjacent the wall O is a feed duct E', which has free communication with the humidifying chamber F', the latter having a liquid tank K' into the liquid of which dips the fibrous absorbent elements J' suspended by rods in the line of flow of the atmosphere. Fresh atmospheric air is admitted by way of chamber H', equipped with preheating radiators I', and extending upwardly from this chamber is a feed duct Q, at the intake of which is a damper q, movable as required for controlling the volume of fresh air to be admitted to the chamber H'. The atmosphere flows out of chamber A through ports o in the division wall P, under the action of motor driven exhauster D, such outflowing air being delivered into the chamber or flue G'. The warm moist air drawn out of the chamber by the action of the exhauster D is discharged in part through a stack or uptake, R, and the remainder of such warm moist air is blown by said exhauster D into a duct, s, which opens into a separate return flue, S, the latter being intermediate the exhaust flue G', and the fresh air intake flue H'. The return flue S opens directly into the humidifying chamber F' at or adjacent the communication of fresh air chamber H' with said humidifying chamber, and thus the recirculated moist and warm air from flue S is mixed with fresh warm air from the chamber H', such fresh air and the recirculated air mixing with each other at the intake to the humidifying chamber, F, and such mixed air flowing within the humidifying chamber F' and into contact with the saturated elements J' suspended therein, for the further operation of picking up moisture, whereby the moisture content of the warmed mixed air is further increased and such revitalized and conditioned air is returned by the flue E' to the work chamber. The eduction flue R leads the discharged atmosphere to the outside air, and said flue R is furnished with a damper, r, for controlling the outflow of the moist air in a determined volume, thus reducing the volume of moist air for recirculation, but such reduction in volume is compensated by the admission of a like volume of fresh air supplied in a warm condition through the flue and chamber Q, H'.

The warm moist atmosphere from the work chamber is revitalized by admixture with fresh air, heated to a suitable temperature, and such mixture of moist air with fresh warm air is conducted within the chamber F' for the further addition to the air of moisture to be taken up from the saturated elements J', whereby an atmosphere heated to an appropriate temperature and with a relatively high moisture content may be repeatedly blown into contact with the material and recirculated within the work chamber. The atmosphere is at a desired temperature and is charged with moisture to a determined point of saturation, which determined temperature and humidity in definite proportions are maintained in the cycles of recirculation, notwithstanding the exchange of heat for moisture results in a drop in temperature, and results, also, in an appreciable increase in the moisture content. To effect the maintenance of the relative proportions of temperature and humidity in the atmosphere, a definite volume of moist air is discharged from the circulatory path through the flue R, the volume being determined by adjustment of valve r, whereas fresh air, heated within the chamber H', is mixed with the returning moist air, and this admixture revitalizes the atmosphere as to its capacity for carrying moisture. The drying atmosphere is thus conditioned both as to temperature and humidity suited to drawing off the moisture content of lumber without checking or cracking the latter, and such operation is conducted within a comparatively short time and by the economical expenditure of steam for heating purposes and of power for motor purposes.

For controlling humidification of the operating air, it is preferred to use a plurality of tanks K within the chamber or flue F, said tanks being provided with drain cocks $k^2$, or other desired means, for emptying one or all of said tanks of the liquid present therein.

Air supplied to the chamber E is at the temperature and humidity suited to the operations of conditioning, seasoning and drying the material within the work chamber A. The condition (temperature and humidity) of the operating air is determined at chamber E prior to flowing into contact with the material, for ascertaining which condition suitable well known instruments, such as thermometers and hygrodeiks, are provided at required places, such as at chamber E.

Fresh atmospheric air supplied by flue H is heated, if required, to a temperature which compensates for the drop in temperature of such air occasioned by the exchange of moisture due to the humdification of the air as it flows through chamber F and into contacts with the moisture-giving elements J, and due, in a measure, also to the admixture of the new (fresh) air with the warmed and moist operating air flowing downwardly within the flue G. The mixture of a determined volume of the operating air from flue G with fresh air admitted by flue H and which carries the required heat units, takes places initially at the entrance to chamber F, the currents of fresh air and of operating air from H, G, respectively, meeting each other and mixing together, and such mixed air flowing within chamber F for picking up moisture from the saturated elements J. The condition of the operating air, observable by the instruments provided at E, enables the operator to determine the regulation required of the radiators and of the humidifying tanks. Should the temperature conditions require, the operator controls the radiators to supply more or less heat units to the inflowing air, and should the humidity of the mixed air demand, the operator can cut one or more of the humidifying tanks out of service for decreasing the moisture content of the operating air, thereby placing the apparatus under control to meet the requirements of a specification of operations for the treatment of a given material.

The herein described apparatus is very effective for carrying out the process of removing water from the lumber; that is, both the pore water and the fiber water. In utilizing the herein described process the fiber water is removed without checking or cracking the lumber.

Having thus fully described the invention, what I claim as new and desire to secure by Letters Patent is:

1. Drying apparatus embodying a humidifying chamber, a liquid tank therein, and a series of moisture diffusing elements dipping into the tank and by capillary action tending to saturate said elements with liquid, said moisture diffusing elements operating to diffuse water vapor for admixture with air adapted to flow within said humidifying chamber, combined with a work chamber, means for circulating air by drawing it through the humidifier and the moisture diffusing elements therein, and means for feeding fresh atmospheric air for admixture with air to be circulated by such circulating means, and means for heating the fresh air prior to admixture with the recirculated air and means for evenly distributing the flow of air through the working chamber.

2. Drying apparatus embodying a work chamber having a wall provided with ports operable to evenly distribute the flow of a drying atmosphere, a humidifier for diffusing water vapor for admixture with a drying atmosphere, means for setting up the flow of a drying atmosphere through the humidifier and the work chamber, means for feeding fresh atmospheric air and mixing the same with the circulating drying atmosphere, and means for preheating the fresh atmospheric air prior to admixture with the circulated air and prior to the exposure of the mixed air to the humidifier, said humidifier and heating means being operable for conditioning the atmosphere for the maintenance therein of definite proportions of temperature and humidity.

3. Drying apparatus embodying a work chamber, a humidifier, means for circulating air by drawing it through said humidifier and forcing it through the entire cross-section of the work chamber, means for preheating fresh atmospheric air, and means for returning to said humidifier a determined volume of moist air mixed with fresh air which prior to said admixture is preheated to a determined temperature, the air heating means and the air returning means being arranged for the delivery to the humidifier of heated air and moist air at points adjacent to each other the heating means being located adjacent the humidifier.

4. Drying apparatus embodying a work chamber, a blower for recirculating air, a humidifier in communication with the recirculating blower and provided with saturable moisture diffusing elements interposed in the line of flow of the recirculated air, and means in close proximity to the diffusing elements for preheating fresh atmospheric air and feeding such preheated air to the humidifier.

5. Drying apparatus embodying a work chamber, a humidifier including moisture diffusing elements interposed in the line of flow of a drying atmosphere, means for setting up the flow of such atmosphere within the work chamber and the humidifier, controllable means for discharging a definite volume of moist air from a circulatory path, a flue connecting the humidifier with the flow means for returning some of the moist air to said humidifier, a separate flue having controllable means for feeding a regulated volume of fresh air directly to said humidifier, and means for preheating the fresh air prior to introducing it into the humidifier, said heating means and said controllable means being operable for the maintenance in the drying atmosphere of temperature and humidity in definite proportions.

6. An apparatus for seasoning lumber by the elimination of moisture from the cells and the fibres of the lumber, embodying a chamber one wall of which is provided with inlet ports in vertical series, a humidifier, air-circulating means connected for drawing air through the humidifier, said air-circulating means acting to set up within the conditioning chamber a flow of air in a determined volume and at a determined velocity, means for dividing the operating air flowing out of the conditioning chamber whereby a determined proportion of said operating air is returned to the humidifier, a fresh air duct directly connected to said humidifier for feeding fresh air to be mixed with the returning operating air, and heating means within the fresh air duct for preheating the inflowing fresh air prior to admixture with the returning operating air and to the flow of the mixed air within the humidifier.

7. An apparatus for seasoning lumber embodying a chamber, a humidifier, a fresh air duct connected directly to said humidifier, heating means for preheating the fresh air prior to the flow thereof within the humidifier, a return flue connected with the conditioning chamber and communicating with the humidifier at a point adjacent to the entry of fresh preheated air to said humidifier, and air circulating means connected for setting up a flow of the operating air at a determined velocity and in a determined quantity within the conditioning chamber, said air-circulating means being operable for establishing the flow of air through the return duct, the fresh air duct, and the humidifier.

8. An apparatus for seasoning lumber embodying a chamber, a humidifier, a fresh air duct connected directly to said humidifier, means for radiating heat into the air flowing through said duct, dividing means connected with said conditioning chamber and with said humidifier for directing the operating air flowing out of the chamber and for returning a determined proportion of said operating air to the humidifier, and air circulating means connected for setting up air flow within the humidifier, the fresh air duct, and the dividing means, said air-circulating means being operable for the circulation within the conditioning chamber of operating air under pressure and conditioned as to temperature by the preheated fresh air and conditioned as to humidity by the moisture in the returning air and by the moisture picked up in the flow within the humidifier.

9. An apparatus for seasoning lumber embodying a chamber one wall of which is provided with ingress ports and the opposite wall of which is provided with egress ports, air-circulating means for setting up the flow within said chamber of operating-air the direction of flow of which within the chamber is controllable by said ingress ports and egress ports, a humidifier positioned in the path of the operating air flowing toward the ingress ports, a duct adjacent the egress ports and connected with the humidifier for directing thereinto a determined proportion of the operating air flowing out of said chamber, a fresh air duct separate from the aforesaid duct, said fresh air duct being connected to said humidifier for feeding preheated fresh air thereto, and heating means within the fresh air duct.

10. An apparatus for seasoning lumber embodying a chamber, air-circulating means operable for setting up the flow within said chamber of operating air at a determined velocity and in a determined volume, a humidifier wherein the flow of operating air is set up by said circulating means, a duct connected with said chamber and said humidifier, said duct affording a path for the flow from the chamber to the humidifier of a portion of the operating air, another duct connected to the humidifier and affording a separate path for fresh air under the energy of the air circulating means to flow into the humidifier, and means for heating fresh air prior to the flow into the humidifier.

11. An apparatus for seasoning lumber comprising a chamber, a humidifier, air-circulating means the intake of which is by way of said humidifier, said air-circulating means being operable in setting up the flow within said chamber of air at a determined velocity and in a determined volume, means for feeding fresh air to said humidifier, means for preheating the fresh air, and means for returning to the humidifier a portion of the air flowing out of the chamber, said returning air and the fresh air being mixed in the flow within the humidifier and such mixed air being charged with water vapor diffused within the humidifier.

12. A lumber-drying apparatus comprising a chamber, a plurality of tanks in the lower portion of said chamber and extending over the bottom thereof, a horizontal partition positioned above the tank structure dividing the chamber into a lumber compartment and a humidifying compartment, one end of said humidifying compartment being in communication with said lumber compartment, a heating chamber in communication with the other end of said humidifying compartment and means for drawing air through said heating, humidifying and lumber compartments respectively.

13. A lumber-seasoning apparatus comprising a lumber-seasoning chamber, a humidifying chamber in communication with said seasoning chamber through a wall having a plurality of distributing ports throughout the entire area thereof, a blower having its intake directly connected with the seasoning chamber for drawing a conditioning atmosphere from said humidifying chamber through the seasoning chamber, means for introducing fresh atmosphere into the humidifying chamber and other means for introducing a portion of the atmosphere exhausted from said blower into the humidifying chamber.

14. A lumber-seasoning apparatus comprising a lumber-seasoning chamber, a humidifying chamber in communication with said seasoning chamber through a ported wall, a blower having its intake directly connected with the seasoning chamber for drawing a conditioning atmosphere from said humidifying chamber through the seasoning chamber, means for introducing fresh atmosphere into the humidifying chamber and other means for introducing a portion of the atmosphere exhausted from said blower into the humidifying chamber and means for heating fresh atmosphere prior to introduction into the humidifying chamber.

15. A lumber-seasoning apparatus comprising a lumber-seasoning chamber, a humidifying chamber in communication with said seasoning chamber through a ported wall, a blower having its intake directly connected with the seasoning chamber for drawing a conditioning atmosphere from said humidifying chamber through the seasoning chamber, means for introducing fresh atmosphere into the humidifying chamber and means for introducing a portion of the atmosphere exhausted from said blower into the humidifying chamber and a ported wall having adjustable port closures and positioned between the seasoning chamber and said blower in the path of the circulating atmosphere to effect an even distribution of the same through the seasoning chamber.

16. Drying apparatus comprising a working chamber, means for preheating atmospheric air, means for effecting the circulation of a drying atmosphere in a required volume and a determined velocity within said working chamber, said circulating means operating to discharge a definite volume of the drying atmosphere and to effect the return of a definite volume of the drying atmosphere to said working chamber, and means whereby the returning atmosphere and the preheated atmospheric air are mixed and are subsequently humidified prior to the flow of the resulting conditioned atmosphere into the working chamber said last mentioned chamber being provided with a wall having a plurality of ports, with which are associated closures adjustable to effect an even flow of the conditioned atmosphere through the working chamber.

In testimony whereof I have hereto signed my name this 10th day of April, 1926.

GORDON D. HARRIS.